US012408247B2

(12) United States Patent
Konstantopoulos et al.

(10) Patent No.: US 12,408,247 B2
(45) Date of Patent: Sep. 2, 2025

(54) ADAPTIVE LOOP TECHNIQUE FOR HIGH PSRR CURRENT REGULATOR

(71) Applicant: Infineon Technologies AG, Neubiberg (DE)

(72) Inventors: Christos Konstantopoulos, Padua (IT); Enrico Tonazzo, Villanova di Camposampiero (IT); Maurizio Galvano, Padua (IT); Mattia Montoncelli, Abano Terme (IT); Federico Cusinato, Tombolo (IT)

(73) Assignee: Infineon Technologies AG, Neubiberg (DE)

( * ) Notice: Subject to any disclaimer, the term of this patent is extended or adjusted under 35 U.S.C. 154(b) by 226 days.

(21) Appl. No.: 18/325,586

(22) Filed: May 30, 2023

(65) Prior Publication Data

US 2024/0407062 A1 Dec. 5, 2024

(51) Int. Cl.

| | |
|---|---|
| ***H05B 45/30*** | (2020.01) |
| ***G05F 1/46*** | (2006.01) |
| ***G05F 1/565*** | (2006.01) |
| ***H05B 45/345*** | (2020.01) |
| ***H05B 45/48*** | (2020.01) |

(52) U.S. Cl.

CPC ........... *H05B 45/345* (2020.01); *G05F 1/467* (2013.01); *G05F 1/565* (2013.01); *H05B 45/48* (2020.01)

(58) Field of Classification Search

CPC ...... H05B 45/10; H05B 45/30; H05B 45/345; H05B 45/48; H05B 47/10; G05F 1/467; G05F 1/565

See application file for complete search history.

(56) References Cited

U.S. PATENT DOCUMENTS

| | | | | |
|---|---|---|---|---|
| 9,781,788 B1 | 10/2017 | Cortigiani et al. | | |
| 10,542,593 B1 | 1/2020 | Mignoli et al. | | |
| 2016/0020692 A1* | 1/2016 | Castelli | H02M 1/4208 | 323/205 |

FOREIGN PATENT DOCUMENTS

| | | | |
|---|---|---|---|
| CN | 102273327 B * | 2/2015 | H05B 33/0815 |

* cited by examiner

*Primary Examiner* — Jimmy T Vu

(74) *Attorney, Agent, or Firm* — Shumaker & Sieffert, P.A.

(57) ABSTRACT

Regulator circuitry configured to manage power supply ripple using an adaptive loop gain that offers ripple rejection performance related to the ripple magnitude for a negative closed loop of the regulator circuitry. The power supply regulator circuitry of this disclosure includes an error amplifier in the closed loop and an adaptive loop gain circuitry. The adaptive loop gain circuit removes a DC component of the sensed output and feeds the sensed output, including the output ripple, to peak detector circuitry to obtain a Vpeak signal. The Vpeak signal output from the peak detector circuitry is a continuous signal that tracks the wave peak. The circuit arrangement multiplies the output of the error amplifier by the signal Vpeak resulting in improved power supply ripple rejection as the ripple amplitude increases. To avoid control signal with zero value during times that the peak-to-peak value of the sensed voltage.

20 Claims, 6 Drawing Sheets

ADAPTIVE LOOP TECHNIQUE FOR HIGH PSRR CURRENT REGULATOR

TECHNICAL FIELD

The disclosure relates to power supply circuits and, more specifically, to techniques for managing current ripple in power supply circuits.

BACKGROUND

Circuits that are driven by direct current (DC) power supplies, such as light emitting diode (LED) driver circuits and other types of circuits, may include regulator circuitry for voltage regulation and/or current regulation. The supplied DC power may be subject to undesirable power supply ripple, e.g., current ripple or voltage ripple. The regulator circuitry, in addition to maintaining the current and/or voltage within a limited range, may also help reject, attenuate, or filter the power supply ripple.

SUMMARY

In general, the disclosure describes regulator circuitry configured to manage power supply ripple using an adaptive loop gain that offers ripple rejection performance related to the ripple magnitude for a negative closed loop of the regulator circuitry. Similar to other regulator circuitry, the power supply regulator circuitry of this disclosure may include an error amplifier in the closed loop to keep output power at or near the desired power level. For example, the error amplifier may output a difference between the sensed output voltage. Vsense, and a reference voltage, Vref, and the closed loop may operate to minimize the error, e.g., the difference between Vsense and Vref.

In addition, the regulator circuitry of this disclosure includes the adaptive loop gain circuitry which removes a DC component of the sensed output and feeds the sensed output, including the output ripple, to peak detector circuitry to obtain a Vpeak signal. The Vpeak signal output from the peak detector circuitry is a continuous signal that tracks the wave peak. In some examples, the peak detector circuitry may also amplify the signal. The circuit arrangement multiplies the output of the error amplifier by the signal Vpeak. To avoid control signal with zero value during times that the peak-to-peak value of the sensed voltage, Vsense, may be close to zero, the circuit also adds the output of the error amplifier to the multiplied signal.

In one example, this disclosure describes a circuit comprising a peak detector circuit configured to receive a sensed signal, rectify the sensed signal and emit a continuous signal, Vpeak, wherein Vpeak is proportional to the peak of the rectified sensed signal; an error amplifier with a first input element, a second input element and an output element, wherein the first input terminal is configured to receive the sensed signal; and an output terminal configured to receive the output of the error amplifier added to the product of Vpeak multiplied by the output of the error amplifier.

In another example, this disclosure describes a method comprising receiving, by closed loop regulation circuitry, a sensed signal; rectifying, by an adaptive loop circuit of the closed loop regulation circuitry, the sensed signal; detecting the peak of the rectified sensed signal; emitting a continuous signal, Vpeak, wherein Vpeak is proportional to the peak of the rectified sensed signal; comparing, by an error amplifier of the adaptive loop circuit, the sensed signal to a reference voltage; multiplying, by the adaptive loop circuit, an output of the error amplifier by Vpeak, wherein the output of the error amplifier is a result of comparing the sensed signal to the reference voltage; adding, by the adaptive loop circuit, the output of the error amplifier to the product of Vpeak multiplied by the output of the error amplifier; using, by the closed loop regulation circuitry, the sum of the output of the error amplifier and the product of Vpeak multiplied by the output of the error amplifier to control a voltage ripple of the sensed signal.

In another example, this disclosure describes a device comprising a peak detector circuit configured to receive a sensed signal, rectify the sensed signal and emit a continuous signal, Vpeak, wherein Vpeak is proportional to the peak of the rectified sensed signal; an error amplifier with a first input element, a second input element and an output element, wherein the first input terminal is configured to receive the sensed signal; and an output terminal configured to receive the output of the error amplifier added to the product of Vpeak multiplied by the output of the amplifier.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure describes regulator circuitry configured to manage power supply ripple using an adaptive loop gain that offers ripple rejection performance related to the ripple magnitude for a negative closed loop of the regulator circuitry. The regulator circuitry of this disclosure may apply electromagnetic compatibility (EMC) robustness to linear current regulators. Some applications for the circuitry of this disclosure may include driver circuits, including driver circuits for light emitting diodes, LEDs.

The regulator circuitry of this disclosure may include an error amplifier in the closed loop and adaptive loop gain circuitry. The adaptive loop gain circuit may remove a direct current (DC) component of the sensed output and feed the sensed output, including the output ripple, to peak detector circuitry to obtain a Vpeak signal. In some examples, the Vpeak signal output from the peak detector circuitry is a continuous signal that tracks the wave peak. The circuit arrangement multiplies the output of the error amplifier by the signal Vpeak resulting in improved power supply ripple rejection as the ripple amplitude increases.

Figure 1:
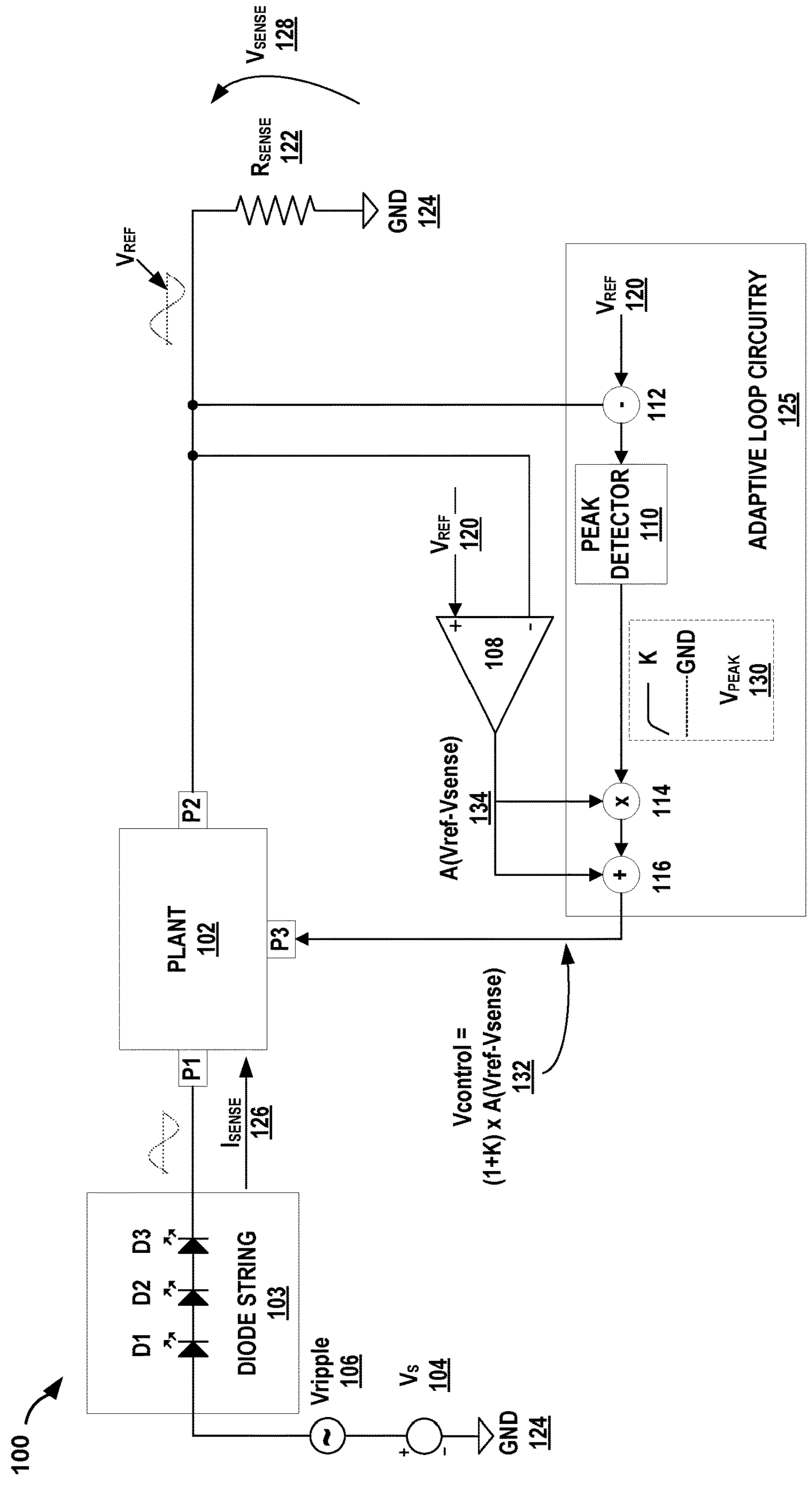
FIG. 1 is a schematic diagram illustrating an example architecture for the regulator circuitry with adaptive loop gain of this disclosure.

FIG. 1 is a schematic diagram illustrating an example architecture for the regulator circuitry with adaptive loop gain of this disclosure. In the example of FIG. 1, system 100 includes a circuit with adaptive loop circuitry 125, error amplifier 108, plant 102, a sense resistor, Rsense 122, a string of diodes 103, a supply voltage, Vs 104 with a ripple, Vripple 106.

Adaptive loop circuitry 125, in the example of FIG. 1, includes peak detector circuit 110, which is configured to receive sensed signal, Vsense 128. Vsense 128 may be based on an output voltage for the power supply. The circuitry of peak detector 110 may rectify the sensed signal, Vsense 128 and emit a continuous signal, Vpeak 130. In some examples, Vpeak 130 is proportional to the peak of the rectified sensed signal, and may be represented as a variable with a scalar value, K. In some examples, peak detector 110 may also amplify Vpeak 130, e.g., in examples when the input to peak detector 110 is small amplitude, but useable signal. In some examples, peak detector 110 may selectively amplify the output, Vpeak 130, e.g., signals above a specified threshold may not be amplified, while output signals below a specified threshold may be amplified.

System 100 further includes error amplifier 108 connected to adaptive loop circuitry 125. In some examples, error amplifier 108 may be considered as a component of adaptive loop circuitry 125. Error amplifier 108 includes a non-inverting input connected to Vref 120. An inverting second input element for error amplifier 108 may connect to plant 102, and receive sensed signal, Vsense 128.

Adaptive loop circuitry 125 also includes an output terminal 132 configured to receive the output 134 of error amplifier 108. Output 134 is also added to the product of Vpeak 130 multiplied by output 134 of error amplifier 108. Output 132 connects to terminal P3 of plant 102.

In some examples, supply voltage Vs 104 connects to ground 124 and to diode string 103. The supply voltage may have a voltage ripple, modeled by Vripple 106, which connects between Vs 104 and diode string 103. In the example of system 100, diode string 103 includes three diodes, D1, D2 and D3 connected in series. In other examples, diode string 103 may include any number of diodes, and in some examples may include more than one string of series connected diodes, with each string connected in parallel (not shown in FIG. 1).

Diode string 103 connects to terminal P1 of plant 102. Plant 102 may receive a current, e.g., Isense 126 from diode string 103. Terminal P2 of plant 102 connects to ground 124 through Rsense 122. Plant 102 may comprise a three-port block that acts as the channel of the regulator circuit of system 100. P1 is the input of the channel, P2 the output and P3 the control input. The negative loop of the regulator reduces the output ripple.

The sense voltage, Vsense 128 is the voltage across Rsense 122. Peak detector 110 also receives Vsense 128. In some examples, the reference voltage Vref 120 is subtracted from Vsense 128.

In operation, the circuitry in system 100 may limit the current ripple, e.g., from Vripple 106, delivered by the LED drivers derived from the variation of the supply line, Vs 104. The architecture forms a negative loop such that error amplifier 108 minimizes the error, and the LED current is set according to $$Isense = \frac{Vsense}{Rsense}$$

where the value of Rsense 122 may be a resistor that is defined by the designer and based on the application for the circuit.

The arrangement of adaptive loop circuitry 125, implements an adaptive loop gain so that as the power supply rejection is improved, the circuitry of system 100 may further reduce the ripple of the load current, e.g., Isense 126. The presented architecture depicted in FIG. 1 is based on the adaptive loop gain, of the regulator, which is set linear dependent on the magnitude of the input ripple, from Vripple 106, such that the adaptive loop gain, increases as the amplitude of the input ripple increases. In this manner the dynamic higher loop gain may improve the power supply rejection of the LED driver.

Power supply rejection can be measured by the power supply rejection ratio (PSRR) under ac analysis. The inverse or reciprocal of PSRR may be represented in Equation 1:

$$PSRR^{-1} = \frac{Vsense[\text{ac}]}{Vripple[\text{ac}]} \qquad [1]$$

The output from terminal P2, Vsense 128, which may include a ripple, is fed to peak detector 110, which outputs Vpeak 130. In some examples, peak detector 110 may include circuitry with a half wave rectifier. In some examples the DC component may be removed from Vsense 128, e.g., by subtracting Vref 120. As noted above, Vpeak 130 may be a continuous signal proportional to the peak of the rectified sensed signal, Vsense 128. Vpeak 130 contains no small signal information, thus may be regarded as a variable, K. Since the DC component for Vpeak 130 is proportional to the $Vsense_{peak}$ which is the peak amplitude of Vsense, then the K variable is also proportional described in Equation 2.

$$K \propto Vsense_{peak} \qquad [2]$$

The output 134 of error amplifier 108 is multiplied by 114 with the Vpeak 130, which may be written as A·(Vref−Vsense)·K. In order to avoid a control signal at terminal 132 with a zero value, e.g., in the example where $Vsense_{peak}$ is close to zero, the output of the error amplifier 108 is also added at 116 to the multiplied signal from 114. The control signal Vcontrol 132 after small signal analysis is described in Equation 3.

$$Vcontrol = A\cdot(Vref - Vsense) + A\cdot(Vref - Vsense)\cdot K \qquad [3]$$

where A is the gain of error amplifier 108. Vcontrol 132 may also be written as Equation 4.

$$V_{control} = (1+K)\cdot A\cdot(Vref - Vsense) \qquad [4]$$

The closed loop gain of the regulator may be represented in Equation 5.

$$\frac{Vsense}{Vref} = \frac{A\cdot(1+K)\cdot G_{p2p3}}{1+A\cdot(1+K)\cdot G_{p2p3}} \quad [5]$$

Where $G_{p2p3}$ is defined as the small signal gain between P2 and P3 ports in open for the loop configuration. The reciprocal quantity of the PSRR, $$PSRR^{-1} = \frac{Vsense}{Vripple},$$

for the closed loop system, is described in Equation 6 where $G_{p2p1}$ is the gain of P2 and P1 ports in open loop configuration.

$$PSRR^{-1} = \frac{G_{p2p1}}{1+A\cdot(1+K)\cdot G_{p2p3}} \quad [6]$$

The above description and equations show that the variable K is proportional to the ripple of Vsense 128. As the ripple in Vsense 128 increases the $PSRR^{-1}$ is proportionally reduced and so the power supply rejection performance is improved.

Figure 2C:
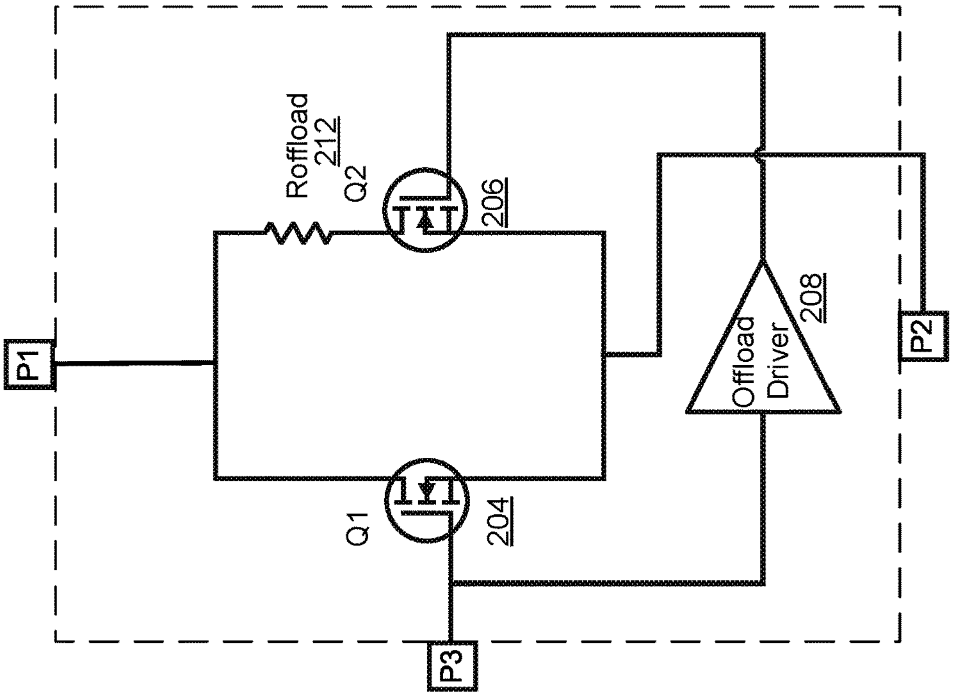
FIGS. 2A, 2B, and 2C are schematic diagrams illustrating three different examples of the plant circuit of this disclosure.
Figure 2B:
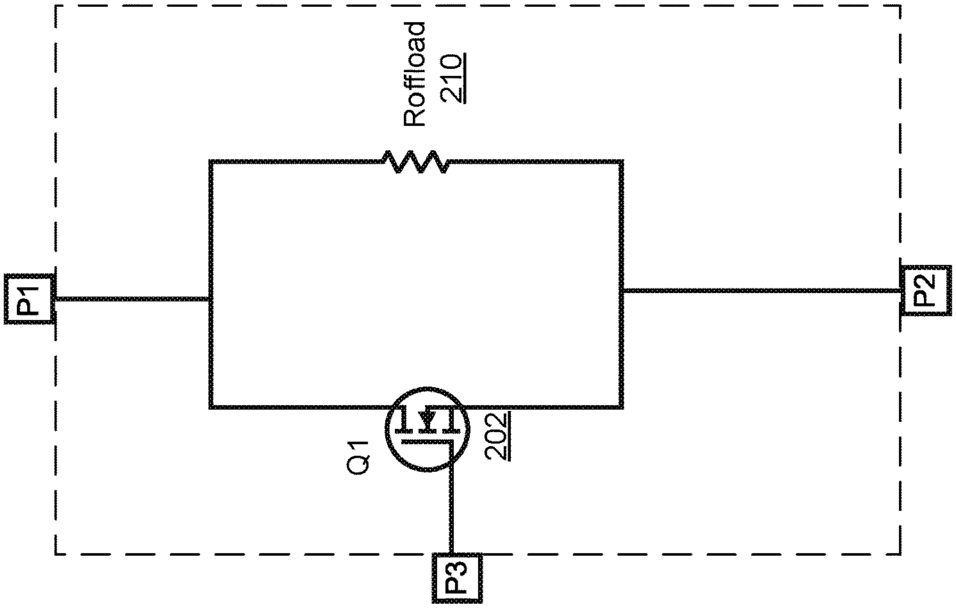
Figure 2A:
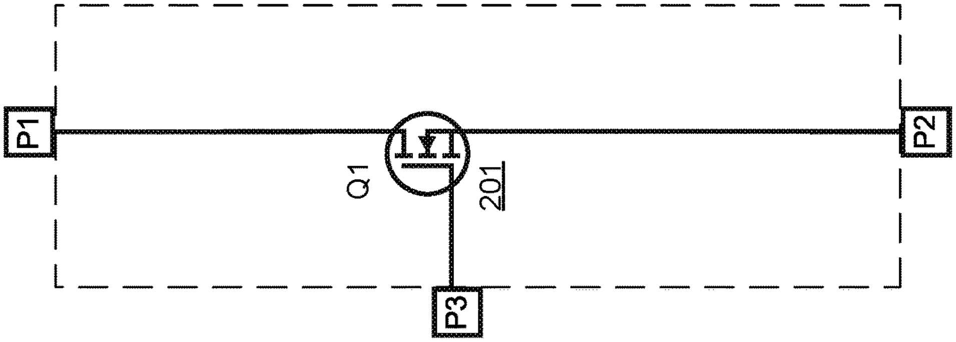

FIGS. 2A, 2B, and 2C are schematic diagrams illustrating three different examples of the plant circuit of this disclosure. The examples of FIGS. 2A-2C illustrates the three-way configuration of plant 108 described above in relation to FIG. 1. The plant can be configured either as a single transistor device plant, e.g., FIG. 2A, as a single transistor device paired with the offload resistor Roffload 210, e.g., as shown in FIG. 2B. The plant may also be implemented as shown in FIG. 2C as a channel that consists of the main regulation device Q1, an offload resistor, Roffload 212 and a secondary device Q2 that is driven by offload driver 220. Offload driver 220 performs regulation of the offload current. The control port P3 of FIG. 2C is connected to the control terminal of the main regulation device, transistor Q1, and the offload regulator path.

For FIGS. 2A-2C, as described above in relation to FIG. 1, P1 is the input element of the channel, P2 the output element and P3 the control input element. For the example of FIG. 2A, P1 connects to the source of N-channel transistor Q1 201, P2 connects to the drain of Q1 201 and P3 connects to the control terminal, or gate, of Q1 201.

In the example of FIG. 2B, P1 connects to P2 through offload resistor, Roffload 210. The drain-source channel of N-channel transistor Q1 202 connects P1 and P2 in parallel to Roffload 210. P3 connects to the gate of Q1 202.

For FIG. 2C, the drain-source channel of N-channel transistor Q2 206 connects in series with Roffload 212, and P1 connects to P2 through the series connection of the drain-source channel of Q2 206 and Roffload 212. The drain-source channel of N-channel transistor Q1 204 also connects P1 and P2. P3 connects to the gate of Q1 204. Offload driver 208 drives the gate of Q2 206 based on the input at P3.

Figure 3:
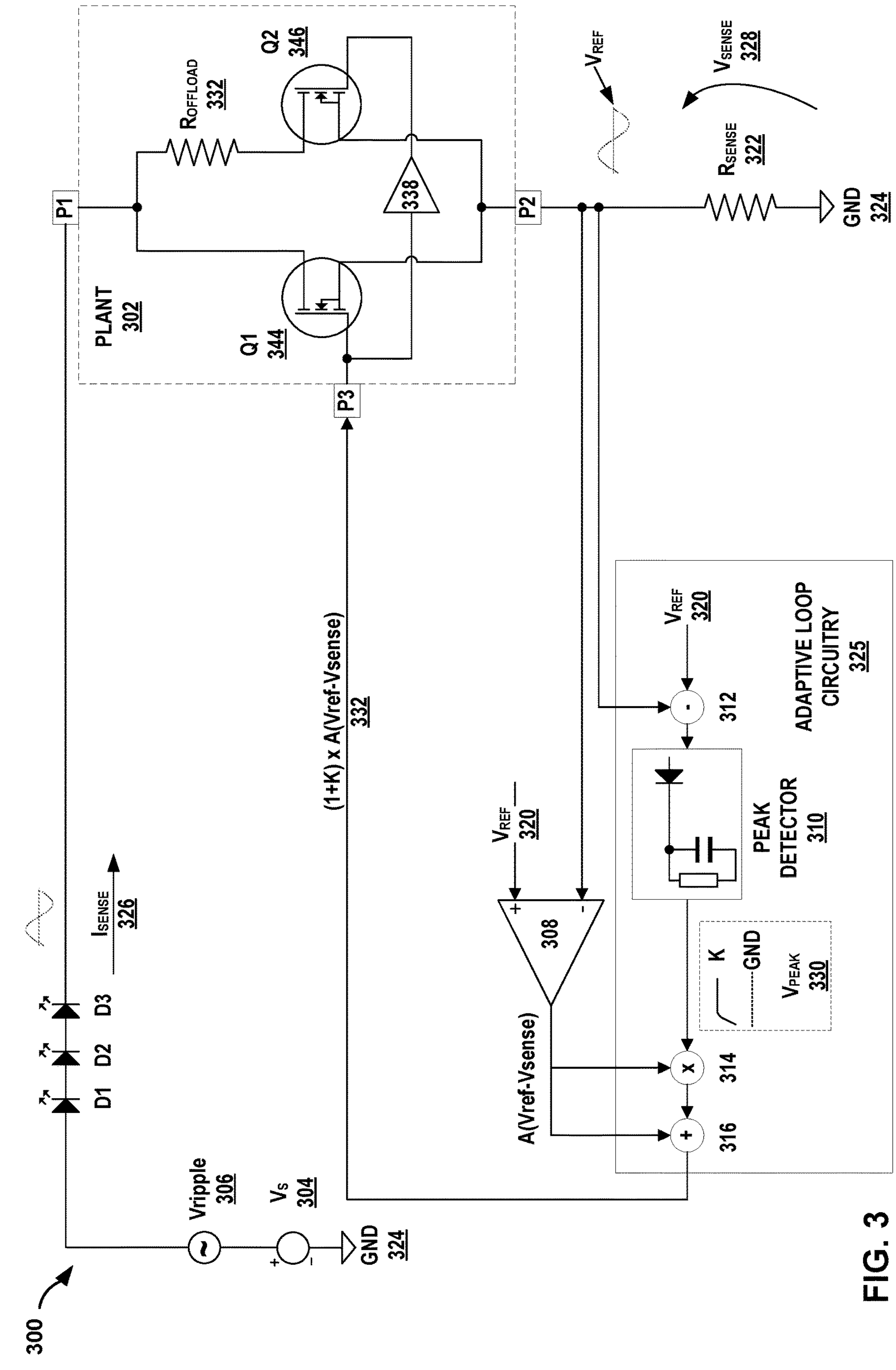
FIG. 3 is a schematic diagram illustrating an example detailed architecture for the regulator circuitry of this disclosure with adaptive loop gain implemented with the plant of FIG. 2C.

FIG. 3 is a schematic diagram illustrating an example detailed architecture for the regulator circuitry of this disclosure with adaptive loop gain implemented with the plant of FIG. 2C. System 300 in the example of FIG. 3 illustrates one possible implementation for the circuitry of this disclosure. Plant 302 is an example of the plant of FIG. 2C and has the same function, architecture and characteristics as described above in relation to FIG. 2C. For example, plant 302 of system 300 includes terminals P1, P2 and P3, transistors Q1 344 and Q2 346, along with Roffload 332 and offload driver 338, which are connected in the same manner as described for FIG. 2C.

Adaptive loop circuitry 325, supply voltage 304, ripple 306, Rsense 322 and error amplifier 308 are examples of adaptive loop circuitry 125, supply voltage 104, ripple 106, Rsense 122 and error amplifier 108 described above in relation to FIG. 1 and have the same connections, functions and characteristics as described for system 100. In the example of FIG. 3, peak detector 310 is implemented as a diode connected to an RC filter. The architecture of peak detector 310 is configured to rectify sensed signal Vsense 328 and emit a continuous signal, Vpeak 330, which is proportional to the peak of the rectified sensed signal. In some examples, peak detector 310 may also include circuitry to amplify Vpeak 330.

In some examples, the peak detector circuit, e.g., peak detector 310, receives a signal from 312 comprising the difference of reference voltage, Vref 320 subtracted from sensed signal, Vsense 328, e.g., from the output terminal P2 of plant 302. Output terminal 332 of adaptive loop circuitry 325 receives the output of error amplifier 308 added by 316 to the product of Vpeak 330 and multiplied by the output of error amplifier 308 at 314. The plant circuit, e.g., plant 302, includes input terminal P3 connected to output terminal 332 of adaptive loop circuitry 325.

System 300 may represent an example use case that may be analyzed for adaptive loop gain based ripple improvement architecture of this disclosure. Plant 302, as with the plant circuits of FIGS. 2A-2C, may also be referred to as a channel in this disclosure. The current regulator is accompanied with the channel, e.g., a channel defined by plant 302, formed by the main regulation device Q1 344, offload resistor Roffload 332, and the transistor Q2 346. The schematic of FIG. 3 includes the power source Vs 304, connected to ground 324, the undesired ripple, modeled by Vripple 306, an LED string, modeled by LEDs D1-D3, and sense resistor, Rsense 322. For system 300, the ripple is produced in series with the voltage source, Vs 304 and is propagated to the channel, plant 302 via terminal P1. The ripple rejection improvement of system 300 is performed by the rectification of the output ripple by peak detector 310 that produces the Vpeak 330 signal comprising a DC component proportional to the peak-to-peak voltage of the output ripple, Vripple 306. The multiplication of signal Vpeak 330 with the output of error amplifier 308 at 314 increases the gain of the regulation loop in proportion to the output ripple magnitude. Thus, the power supply rejection is improved according to Equation 6 above.

Figure 4:
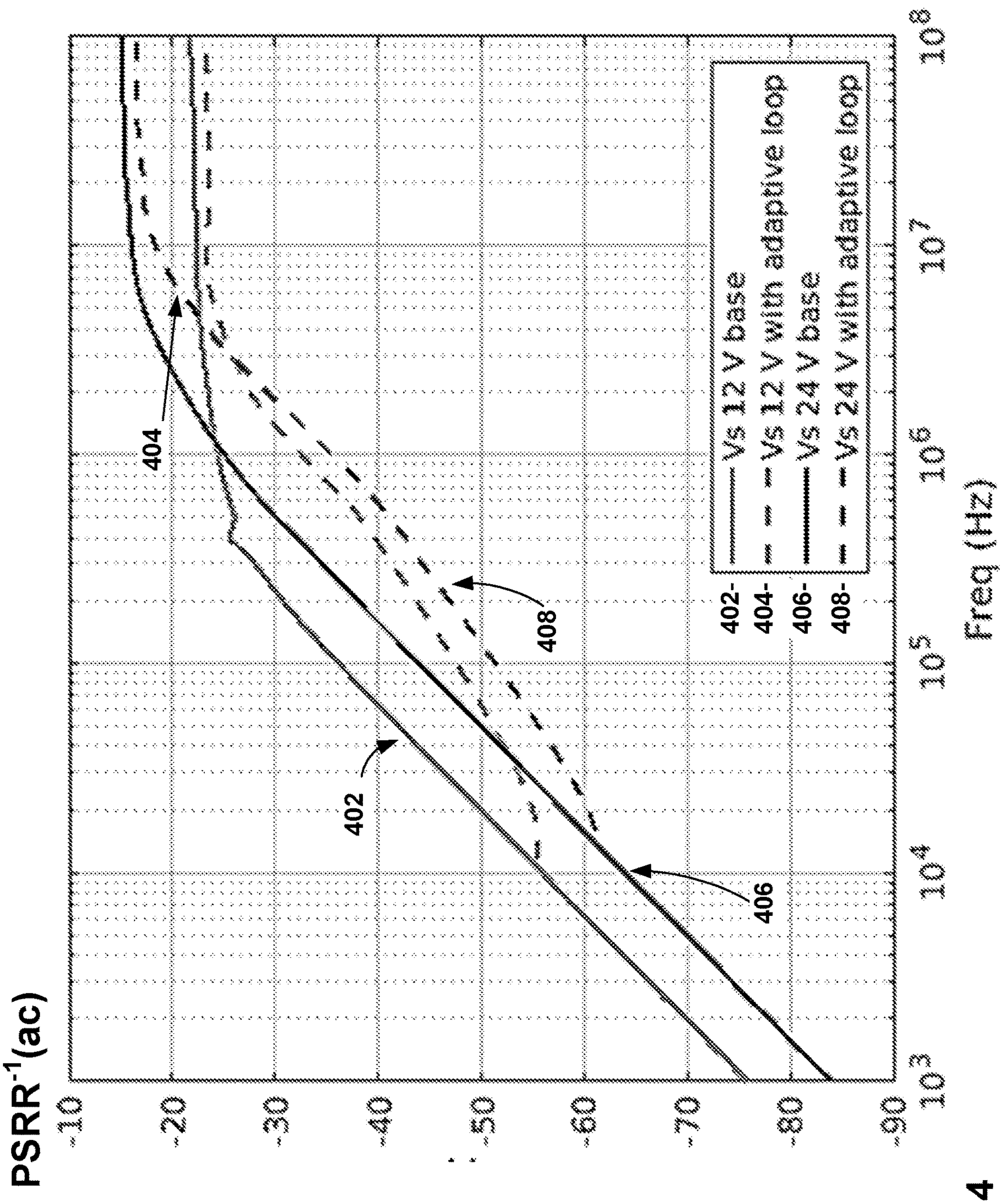
FIG. 4 is a graph illustrating an example of power supply rejection performance for the regulator circuitry with adaptive loop gain of this disclosure.

FIG. 4 is a graph illustrating an example of power supply rejection performance for the regulator circuitry with adaptive loop gain of this disclosure. The example of FIG. 4 illustrates the inverse power supply rejection of the adaptive loop gain implementation of this disclosure of system 300 in FIG. 3 compared to a base power supply regulation circuit without the adaptive loop circuitry of this disclosure. For example, a base power supply regulation loop may include an error amplifier that provides feedback to a plant, e.g., as in FIG. 1, but without the peak detector output multiplied by the error amplifier output of the adaptive loop circuitry of this disclosure (not shown in FIG. 1 or 4).

The example of FIG. 4 uses a modeled one-volt power supply peak-to-peak ripple, e.g., for Vripple 306 described above in relation to FIG. 3. Curve 402 shows the performance of a 12V base circuit and curve 404 shows the improvement for a 12V circuit with the adaptive loop circuitry of this disclosure. Similarly, curve 406 shows the performance of a 24V base circuit and curve 408 shows the improvement for a 24V circuit with the adaptive loop circuitry of this disclosure.

As shown in FIG. 4, in case of the adaptive loop implementation, the ripple that is measured in Vsense may be attenuated by as much as 15 dB more than the base solution in the tested use case. Moreover, the adaptive loop mechanism of this disclosure may also have an advantage over other types of regulation circuitry in that the circuitry of this disclosure operates independent of the supply voltage magnitude that may force the operational regions of the devices Q1 and Q2 of plant 302 in FIG. 3 to change.

Figure 5:
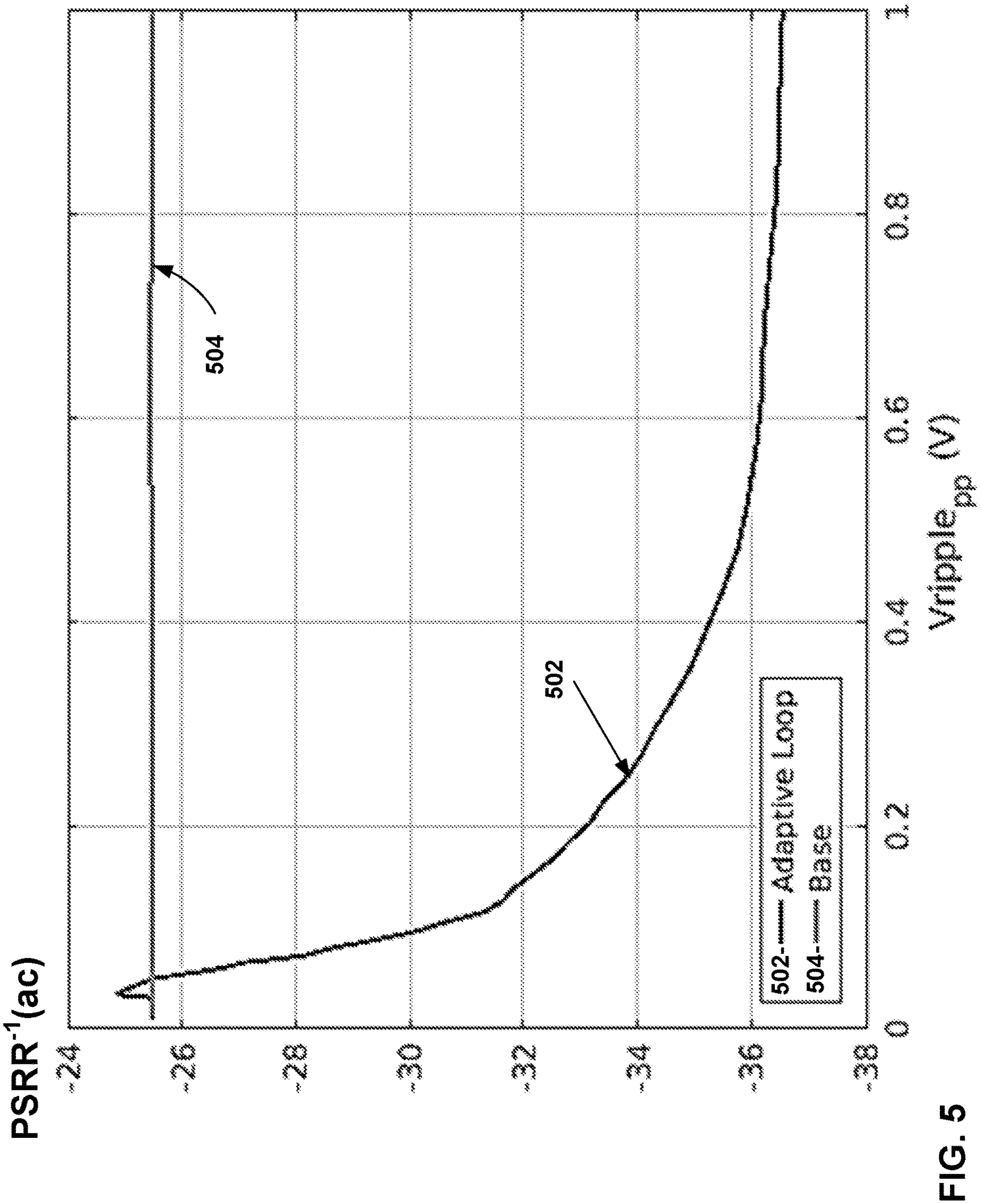
FIG. 5 is a graph illustrating an example of performance as a function of the amplitude of the ripple the circuitry with adaptive loop gain of this disclosure.

FIG. 5 is a graph illustrating an example of performance as a function of the amplitude of the ripple the circuitry with adaptive loop gain of this disclosure. In the presented invention the ripple rejection performance is a function of the amplitude of the ripple at a certain frequency as described in Equation 6, above. FIG. 5 illustrates the power supply rejection ratio for base and adaptive loop implementation for a supply voltage, Vs, of 12 V, with a modeled input ripple of frequency at 613 kHz and a varying peak-to-peak amplitude. As shown, the power supply rejection 502 is a function of the ripple amplitude due to the particular adaptive loop gain architecture of this disclosure, while the base implementation 504 remains steady over the Vripple sweep. In this manner, the adaptive loop gain architecture of this disclosure may provide advantages over other types of regulation circuits, as can be seen by the measurement of the $PSRR^{-1}$ observed behavior of the $PSRR^{-1}$ under varying Vripple.

Figure 6:
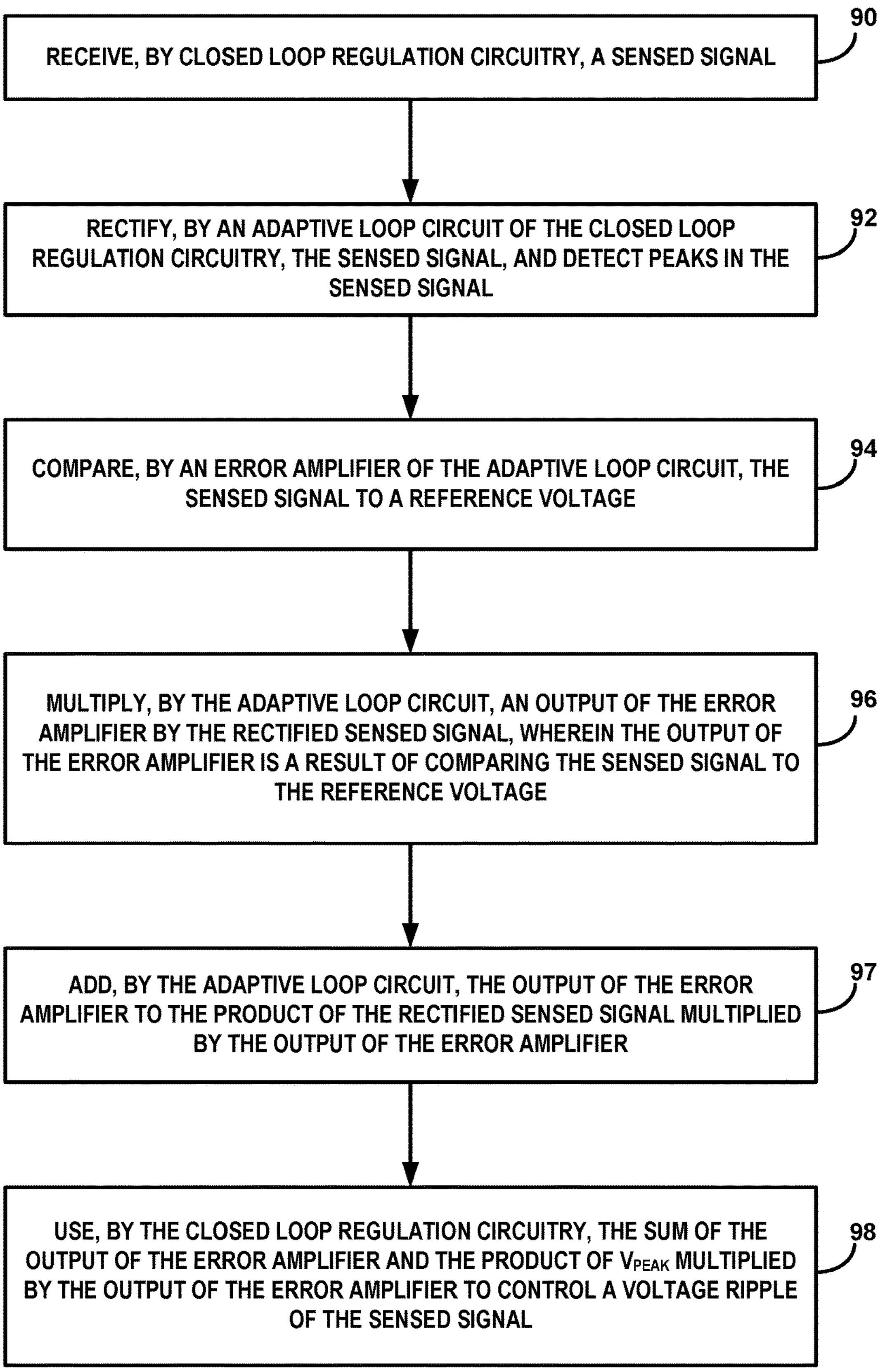
FIG. 6 is a flow chart illustrating an example operation for the circuitry of this disclosure.

FIG. 6 is a flow chart illustrating an example operation for the circuitry of this disclosure. The blocks of FIG. 6 will be described in terms of the example of FIG. 3, unless other noted.

As described above in relation to FIG. 3, system 300, which, along with system 100 of FIG. 1, may be described as including closed loop regulation circuitry, may receive sensed signal, Vsense 328 from terminal P2 of plant 302 (90). Vsense 328 may include a ripple, modeled by Vripple 306.

Adaptive loop circuit 325 of the closed loop regulation circuitry, may rectify the sensed signal. Vsense 328 (92). In system 300, peak detector 310 includes rectification circuitry, e.g., a diode, configured to rectify the received sensed signal. Peak detector 310 may also include circuitry configured to detect the peak of the rectified sensed signal. As described above in relation to FIGS. 1 and 3, peak detector 310 may also emit a continuous signal, e.g., Vpeak 330, that is proportional to the peak of the rectified sensed signal.

Error amplifier 308 of the adaptive loop circuit receives Vref 320 at the non-inverting input and Vsense 328 at the inverting input in the example of FIG. 3. Error amplifier 308 compares the sensed signal to the reference voltage and outputs Ax (Vref−Vsense), where Ax is the gain of error amplifier 308 (94). Adaptive loop circuit 325 multiplies the output of the error amplifier by Vpeak 330, at 314 (96).

As described above in relation to FIGS. 1 and 3, adaptive loop circuit 325 also adds the output of the error amplifier at 316 to the product of Vpeak 330 multiplied by the output of the error amplifier (97) to avoid a zero input to the control input terminal P3 of plant 302. The closed loop regulation circuitry uses the sum of the output of the error amplifier and the product of Vpeak 330 multiplied by the output of the error amplifier to control voltage ripple of the sensed signal (98). As described above in relation to FIGS. 4 and 5, as the ripple increases, the gain increases, and results in better ripple control, when compared to other arrangements of regulator circuits.

The disclosure may also be understood by referring to the following clauses.

Clause 1: A circuit comprising a peak detector circuit configured to receive a sensed signal, rectify the sensed signal and emit a continuous signal, Vpeak, wherein Vpeak is proportional to the peak of the rectified sensed signal; an error amplifier with a first input element, a second input element and an output element, wherein the first input terminal is configured to receive the sensed signal; and an output terminal configured to receive the output of the error amplifier added to the product of Vpeak multiplied by the output of the error amplifier.

Clause 2: The circuit of clause 1, wherein the second input of the error amplifier is configured to receive a reference voltage.

Clause 3: The circuit of any of clauses 1 and 2, wherein the peak detector circuit is further configured to receive a signal comprising the difference of a reference voltage subtracted from the sensed signal.

Clause 4: The circuit of any of clauses 1 through 3, wherein the peak detector circuit is configured to amplify Vpeak.

Clause 5: The circuit of any of clauses 1 through 4, wherein the peak detector circuit comprises a diode and an RC filter.

Clause 6: The circuit of any of clauses 1 through 5 further comprising a sense resistor, wherein the sensed signal is a voltage across the sense resistor.

Clause 7: The circuit of any of clauses 1 through 6, further comprising a plant circuit, wherein the plant circuit comprises an output terminal configured to output the sensed signal, and wherein the plant circuit comprises an input terminal configured to connect to the output terminal of the adaptive loop circuitry.

Clause 8: The circuit of clause 7, wherein the circuit is configured to control a power supply ripple for a light emitting diode (LED) circuit.

Clause 9: The circuit of clause 8, wherein the input terminal for the plant circuit is a first input terminal, the plant circuit further comprising a second input terminal, and wherein the second input terminal is configured to connect to the LED circuit.

Clause 10: The circuit of any of clauses 7 through 9, wherein the plant circuit comprises an offload resistor.

Clause 11: A method comprising receiving, by closed loop regulation circuitry, a sensed signal; rectifying, by an adaptive loop circuit of the closed loop regulation circuitry, the sensed signal; detecting the peak of the rectified sensed signal; emitting a continuous signal, Vpeak, wherein Vpeak is proportional to the peak of the rectified sensed signal; comparing, by an error amplifier of the adaptive loop circuit, the sensed signal to a reference voltage; multiplying, by the adaptive loop circuit, an output of the error amplifier by Vpeak, wherein the output of the error amplifier is a result of comparing the sensed signal to the reference voltage; adding, by the adaptive loop circuit, the output of the error amplifier to the product of Vpeak multiplied by the output of the error amplifier; using, by the closed loop regulation circuitry, the sum of the output of the error amplifier and the product of Vpeak multiplied by the output of the error amplifier to control a voltage ripple of the sensed signal.

Clause 12: The method of clause 11, further comprising, subtracting the reference voltage from sensed signal before rectifying the sensed signal.

Clause 13: The method of any of clauses 11 and 12, further comprising amplifying Vpeak before emitting Vpeak.

Clause 14: The method of any of clauses 11 through 13, wherein the adaptive loop circuit comprises a diode and an RC filter.

Clause 15: The method of any of clauses 11 through 14, wherein the closed loop regulation circuitry comprises a sense resistor, and wherein the sensed signal is a voltage across the sense resistor.

Clause 16: The method of any of clauses 11 through 15, further comprising, controlling a power supply ripple for a light emitting diode (LED) circuit.

Clause 17: The method of clause 16, wherein the closed loop regulation circuitry further comprises a plant circuit, the method further comprising outputting, by the plant circuit the sensed signal; and receiving, by the plant circuit, the sum of the output of the error amplifier and the product of Vpeak multiplied by the output of the error amplifier from the adaptive loop circuit.

Clause 18: The method of clause 17, further comprising, receiving, by the plant circuit, an electrical current from the LED circuit.

Clause 19: The method of any of clauses 17 and 18, wherein the plant circuit comprises an offload resistor.

Clause 20: A device comprising a peak detector circuit configured to receive a sensed signal, rectify the sensed signal and emit a continuous signal, Vpeak, wherein Vpeak is proportional to the peak of the rectified sensed signal; an error amplifier with a first input element, a second input element and an output element, wherein the first input terminal is configured to receive the sensed signal; and an output terminal configured to receive the output of the error amplifier added to the product of Vpeak multiplied by the output of the amplifier.

Various examples of the disclosure have been described. These and other examples are within the scope of the following claims.

What is claimed is:

1. A circuit comprising adaptive loop circuitry, wherein the adaptive loop circuitry comprises:

a peak detector circuit configured to receive a sensed signal, rectify the sensed signal, and emit a continuous signal, Vpeak, wherein Vpeak is proportional to the peak of the rectified sensed signal;

an error amplifier with a first input element, a second input element, and an output element, wherein the first input element of the error amplifier is configured to receive the sensed signal; and an output terminal configured to receive an output of the error amplifier added to a product of Vpeak multiplied by the output of the error amplifier.

2. The circuit of claim 1, wherein the second input element of the error amplifier is configured to receive a reference voltage.

3. The circuit of claim 1, wherein the peak detector circuit is further configured to receive a signal comprising the difference of a reference voltage subtracted from the sensed signal.

4. The circuit of claim 1, wherein the peak detector circuit is configured to amplify Vpeak.

5. The circuit of claim 1, wherein the peak detector circuit comprises a diode and an RC filter.

6. The circuit of claim 1 further comprising a sense resistor, wherein the sensed signal is a voltage across the sense resistor.

7. The circuit of claim 1, further comprising a plant circuit, wherein the plant circuit comprises an output terminal configured to output the sensed signal, and wherein the plant circuit comprises an input terminal configured to connect to the output terminal of the adaptive loop circuitry.

8. The circuit of claim 7, wherein the circuit is configured to control a power supply ripple for a light emitting diode (LED) circuit.

9. The circuit of claim 8, wherein the input terminal for the plant circuit is a first input terminal, the plant circuit further comprising a second input terminal, and wherein the second input terminal is configured to connect to the LED circuit.

10. The circuit of claim 7, wherein the plant circuit comprises an offload resistor.

11. A method comprising:

receiving, by closed loop regulation circuitry, a sensed signal;

rectifying, by an adaptive loop circuit of the closed loop regulation circuitry, the sensed signal;

detecting a peak of the rectified sensed signal;

emitting a continuous signal, Vpeak, wherein Vpeak is proportional to the peak of the rectified sensed signal;

comparing, by an error amplifier of the adaptive loop circuit, the sensed signal to a reference voltage;

multiplying, by the adaptive loop circuit, an output of the error amplifier by Vpeak, wherein the output of the error amplifier is a result of comparing the sensed signal to the reference voltage;

adding, by the adaptive loop circuit, the output of the error amplifier to the product of Vpeak multiplied by the output of the error amplifier;

using, by the closed loop regulation circuitry, a sum of the output of the error amplifier and a product of Vpeak multiplied by the output of the error amplifier to control a voltage ripple of the sensed signal.

12. The method of claim 11, further comprising, subtracting the reference voltage from sensed signal before rectifying the sensed signal.

13. The method of claim 11, further comprising amplifying Vpeak before emitting Vpeak.

14. The method of claim 11, wherein the adaptive loop circuit comprises a diode and an RC filter.

15. The method of claim 11, wherein the closed loop regulation circuitry comprises a sense resistor, and wherein the sensed signal is a voltage across the sense resistor.

16. The method of claim 11, further comprising, controlling a power supply ripple for a light emitting diode (LED) circuit.

17. The method of claim 16, wherein the closed loop regulation circuitry further comprises a plant circuit, the method further comprising:

outputting, by the plant circuit the sensed signal; and receiving, by the plant circuit, the sum of the output of the error amplifier and the product of Vpeak multiplied by the output of the error amplifier from the adaptive loop circuit.

18. The method of claim 17, further comprising, receiving, by the plant circuit, an electrical current from the LED circuit.

19. The method of claim 17, wherein the plant circuit comprises an offload resistor.

20. A device comprising adaptive loop circuitry, wherein the adaptive loop circuitry comprises:

a peak detector circuit configured to receive a sensed signal, rectify the sensed signal, and emit a continuous signal, Vpeak, wherein Vpeak is proportional to the peak of the rectified sensed signal;

an error amplifier with a first input element, a second input element, and an output element, wherein the first input element of the error amplifier is configured to receive the sensed signal; and an output terminal configured to receive an output of the error amplifier added to a product of Vpeak multiplied by the output of the amplifier.

* * * * *